United States Patent [19]

Maki et al.

[11] Patent Number: 4,967,555
[45] Date of Patent: Nov. 6, 1990

[54] HYDRAULIC CONTINUOUSLY VARIABLE SPEED TRANSMISSION WITH RELIEF VALVE TO PREVENT ENGINE STALL

[75] Inventors: Kazuya Maki, Aichi; Takeo Suzuta, Saitama, both of Japan

[73] Assignee: Honda Giken Kogyo Kabushiki Kaisha, Tokyo, Japan

[21] Appl. No.: 251,532

[22] Filed: Sep. 30, 1988

[30] Foreign Application Priority Data

Oct. 14, 1987 [JP] Japan .................. 62-259225

[51] Int. Cl.$^5$ .......................................... F16D 31/02
[52] U.S. Cl. .................................... 60/468; 60/487; 60/488; 60/494; 417/294; 91/489
[58] Field of Search ............ 60/488, 494, 468, 487; 91/486, 489; 417/294

[56] References Cited

U.S. PATENT DOCUMENTS

| | | | |
|---|---|---|---|
| 2,529,349 | 11/1950 | Nathan | 417/294 |
| 2,648,952 | 8/1953 | Dasher | 417/294 |
| 2,706,384 | 4/1955 | Schott | 417/294 |
| 3,161,023 | 12/1964 | Margolin | 60/488 |
| 3,543,514 | 12/1970 | Reimer | 60/468 |
| 3,655,004 | 4/1972 | Hoashi | 60/494 |
| 3,698,189 | 10/1972 | Reimer | 60/53 A |
| 3,986,587 | 10/1976 | Becker | 60/330 |
| 4,142,617 | 3/1979 | Collier | 60/325 |
| 4,478,134 | 10/1984 | Kawahara | 91/488 |
| 4,516,399 | 5/1985 | Höller et al. | 60/357 |

FOREIGN PATENT DOCUMENTS

| | | |
|---|---|---|
| 0231059 | 8/1987 | European Pat. Off. . |
| 0240178 | 10/1987 | European Pat. Off. . |
| 2363762 | 6/1975 | Fed. Rep. of Germany . |
| 56-95722 | 8/1981 | Japan . |
| 57-76357 | 5/1982 | Japan . |
| 61-207229 | 9/1986 | Japan . |
| 62-127562 | 6/1987 | Japan . |

Primary Examiner—Edward K. Look
Assistant Examiner—John E. Ryznic
Attorney, Agent, or Firm—Lyon & Lyon

[57] ABSTRACT

A hydraulic continuously variable speed transmission includes a hydraulic pump and a hydraulic motor, at least one of said hydraulic pump and motor being of variable displacement type. A hydraulic path is formed in a member of the pump which rotates in synchronism with an output shaft of engine, for communicating hydraulic a pressure chamber of the hydraulic pump with a drain. A check valve is provided in the hydraulic path for closing the hydraulic path under centrifugal force created by the rotation of the member when this member is in rotation faster than a predetermined speed, and for opening the hydraulic path against a centrifugal force when the member is in rotation slower than the predetermined speed.

10 Claims, 2 Drawing Sheets

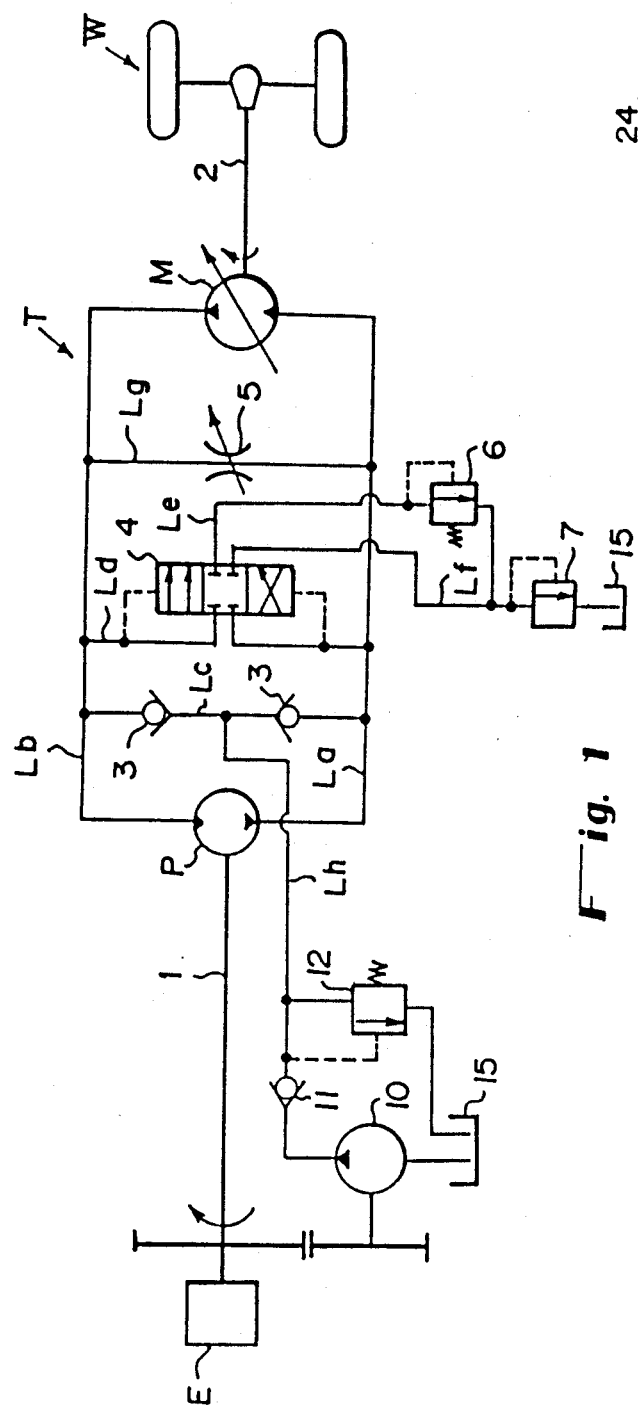
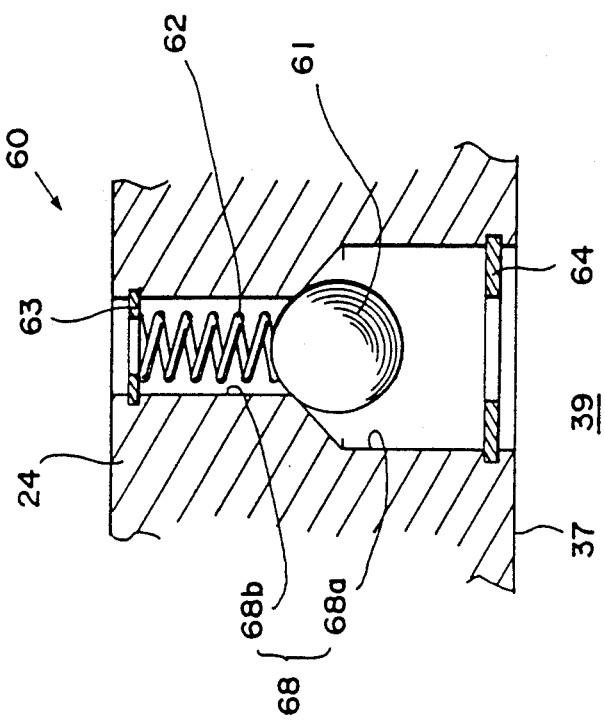
Fig. 1
Fig. 3

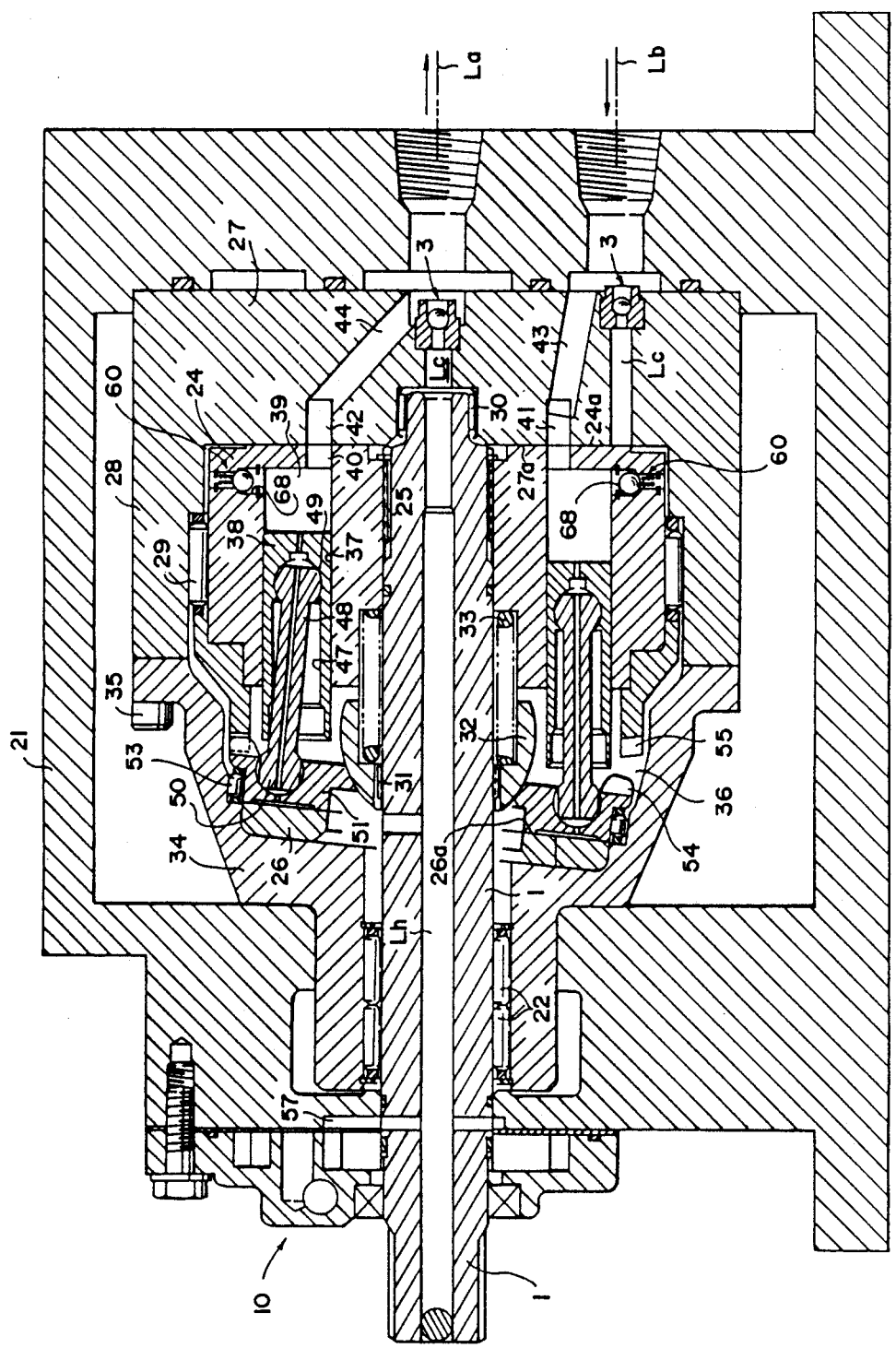

HYDRAULIC CONTINUOUSLY VARIABLE SPEED TRANSMISSION WITH RELIEF VALVE TO PREVENT ENGINE STALL

BACKGROUND OF THE INVENTION

The invention relates to a hydraulic continuously-variable speed transmission comprising a hydraulic pump and a hydraulic motor.

With a continuously variable speed transmission comprising a closed circuit disposed between a hydraulic pump and a hydraulic motor at least one of which is of the variable displacment type, as disclosed in the Japanese Patent laid-open publication No. 95722/1981, a bypass line is provided between the pump and motor to communicate two hydraulic lines constituting the closed circuit, and the continuously variable speed transmission is clutch-controlled by opening and closing the bypass line with a opening control valve (clutch valve).

When a vehicle with such a continuously variable speed transmission mounted thereon is decelerated by releasing the depression of the acceleration pedal, such control has been adopted as to prevent excessive engine brake and to maintain smooth running by opening the clutch valve when the vehicle speed falls below a given value (see, e.g., Japanese Patent laid-open publication No. 127562/1987).

Such control, however, when such aggressive braking is applied as to cause wheel locking, may cause engine stall due to overloading caused by the wheel locking before the vehicle speed comes down to the given value where the clutch valve is opened.

SUMMARY OF THE IVENTION

Regarding such problems, the present invention is intended to provide a continuously variable speed transmission that can relieve the engine load and prevent engine stall even when the wheels are locked by aggressive braking while driving.

In order to accomplish the above object, the continuously variable speed transmission according to the present invention comprises a hydraulic path which connects the hydraulic pressure chamber of the pump with the outside and is formed in the member that rotates with the same speed as the engine shaft in the hydraulic pump, and a centrifugal type check valve. The check valve is adapted to shut the path under the influence of the centrifugal force when it is rotated together with the member faster than a predetermined speed, but open the path against the centrifugal force when it is rotated below the predetermined speed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus do not limit the scope of the present invention. Wherein:

FIG. 1 is a hydraulic circuit diagram of a hydraulic continuously variable speed transmission according to the invention.

FIG. 2 is a cross sectional view of the hydraulic pump used with the above continuously variable speed transmission.

FIG. 3 is a cross sectional view of a centrifugal check valve provided in a cylinder block of the above hydraulic pump.

DESCRIPTION OF THE PREFERRED EMBODIMENTS

FIG. 1 shows a hydraulic circuit diagram of a continuously variable speed transmission provided with a controller, according to the first embodiment of the invention. The continuously variable speed transmission has a constant displacement hydraulic pump P driven by the engine E through the input shaft 1 and a variable displacement hydraulic motor M connected to the output shaft 2 driving the wheels W. These hydraulic pump P and motor M constitute a closed hydraulic circuit along with two hydraulic lines: the first hydraulic line La by which the delivery port of the pump P communicate with the suction port of the motor M, and the second hydraulic line Lb by which the suction port of the pump P does with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La or Lb which has a lower pressure through the check valves 3, 3. A fourth hydraulic line Ld having a shuttle valve 4 is connected to the closed circuit. To the shuttle valve 4 is connected a fifth hydraulic line Le and a sixth hydraulic line LP which respectively have a high pressure relief valve 6 and a low pressure relief valve 7 and are connected to the oil sump 15. The shuttle valve 4 is a 2-port 3-position selector valve, which is operated in response to a hydraulic pressure difference of the first and second hydraulic lines to connect either of the first or second hydraulic lines La, Lb having higher pressure to the fifth hydraulic line Le as well as to connect the other having lower pressure with the sixth hydraulic line Lf. Therefore, the relief pressure of a higher pressure line is regulated by the high pressure relief valve 6, and the relief hydraulic pressure of the other lower pressure-side line is regulated by the low pressure relief valve 7.

Between the first and second hydraulic lines La and Lb is provided a seventh hydraulic line Lg to short-cut the two lines. The seventh hydraulic line Lg is provided with a clutch valve 5, a variable opening control valve to control the opening degree of the line. Therefore, the throttle control of the clutch valve 5 can effect clutch control to control the transmission of driving force from the hydraulic pump P to the hydraulic motor M.

The engine E drives the hydraulic pump P, the hydraulic pressure generated by the pump P drives the hydraulic motor M. The drive power of the motor M is transmitted to the wheels W through the output shaft 2 to drive the wheels W. The hydraulic motor M can be, for example, a swash plate type axial piston motor which permits the speed reduction ratio of the continuously variable speed transmission T to be steplessly changed by controlling the tilt angle of the swash plate. The control method of the swash plate is not described because it is well-known.

The hydraulic pump of the continuously variable transmission T is shown in FIG. 2. An input shaft 1 is rotatably supported by a fixed frame 21 through bearings 22. A cylinder block 24 is connected with the shaft 1 through a spline 25 inside the frame 21. A swash plate 26 and a distribution plate 27 are respectively placed on the left and right sides of the cylinder block 24 (in FIG. 2).

On the outer periphery of the distribution plate 27 is proved a cylindrical housing 28 integral therewith for accommodating the cylinder block 24. The cylinder block 24 is rotatably supported by the housing 28 through bearings 29. One end of the input shaft 1, whihc penetrates through the cylinder block 24 is rotatably supported by the distribution plate 27 through bearings 30. A compression spring 33 is provided between the cylinder block 24 and a spring holder 32 connected with the shaft 1 through splines 31.

The swash plate 26 is firmly mounted on a cup-shaped swash plate holder 34 surrounding the shaft 1, and is held inclined at a predetermined angle with respect to the shaft 1.

The housing 28 and the swash plate holder 34 are fastened to each other by bolts 35, and a fluid chamber 36 is provided inside the housing 28 and the holder 34. The housing 28 and the swash plate holder 34 are further fixed on the frame 21 by some appropriate securing means.

The cylinder block is provided with a multiplicity of cylinder bores 37 extending from the end thereof near the swash plate 26, in parallel with the shaft 1. In each of the cylinder bores 37 is slidably engaged a plunger 38.

Each plunger 38 forms a hydraulic pressure chamber 39 between itself and the closing end of the cylinder bore 37 associated therewith. Each pump port 40 communicating with the respective hydraulic pressure chamber 39 has an opening at the end surface 24a of the cylinder block 24. All of the pump ports 40 are arranged on a phantom circle about the rotational axis of the cylinder block 24.

On the other hand, an arc-shaped inlet groove 41 which can communicate with some of the pump ports 40 is provided on one half of the end surface 27a of the distribution plate 27, while on the other half end surface is formed an arc-shaped outlet groove 42 which can also communicate with the other of pump ports 40. An inlet and an outlet port 43, 44 each of which separately communicates with said inlet and outlet grooves 41, 42, respectively, opens on the right side surface of the distribution plate 27. The inlet port 43 is connected with a hydraulic path Lb communicating with the outlet port of the hydraulic motor M. The outlet port 44 is connected with a hydraulic path La communicating with the inlet port of the hydraulic motor M.

Each plunger 38 is provide with a hole 47 which opens towards the swash plate 26. Rods 48 inserted in the holes 47 are pivotally connected with the mating plungers 38 by inner ball joints thereof. The rods 48 protrude from the respective openings 47 outwardly, and are also pivotally connected with an annular shoe 51 which is in turn slidably supported on the slant surface 26a of the swash plate 26, by outer end ball joints 50.

The annular shoe 51 is a one piece body so as to surround the input shaft 1. The outer surface of the shoe 51 is supported by the swash plate holder 34 through the bearings 53. A spring holder 32 is slidably supported the internal surface of the shoe 51. The spring holder 32 is pushed by a spring 33 towards the shoe 51 so that the shoe 51 can be rotated on the swash plate 26.

A bevel gear 55 is integrally mounted on the corner end of the cylinder block 24, while a bevel gear 54 is formed integrally on the shoe 51 and engages with the bevel gear 55. These bevel gears 54, 55 have the same number of teeth to synchronize their rotational speed.

A charge pump 10 is mounted on one side of the frame 21, which is to be driven by the input shaft 1. The outlet port 57 of the pump 10 communicates with the fluid chamber 39 via a hydraulic path Lh formed in the input shaft 1. The fluid chamber 36 also communicates with the inlet port 43 and the outlet port 44 of the distribution plate 27 through the check valves 3,3. Hence, the charge pump 10 can provide the necessary amount of fluid to the fluid chamber 36, inlet port 43, and the outlet port 44, to replenish exhausted fluid.

The cylinder block 24 is further provided with a multiplicity of drain hydraulic passages 68 each formed so as to extend radially, from the cylinder bore 37 constituting the pump hydraulic pressure chambers 39, to open at the periphery of the cylinder block 24. In each of drain hydraulic lines 68 is provided a centrifugal check valve 60 for selectively opening and closing the passage 68 under the influence of a centrifugal force acting upon the centrifugal check valve 60. The centrifugal check valve 60 is composed of a ball 61 installed in the drain hydraulic passage 68 and a compression coil spring 62 forcing radially inwardly the ball 61, as shown in FIG. 3. The drain hydraulic passage 68, formed in the cylinder block 24 and extending radially outwardly from the pump hydraulic pressure chamber 39, is composed of a first hydraulic path 68a having a larger inner diameter and extending radially inwardly, and a second hydraulic path 68b having a smaller inner diameter and extending radially outwardly. A stopping ring 64 for preventing the ball 61 from popping out and a stopping ring 63 for supporting the spring 62 are provided inside the paths 68a, 68b respectively.

In such a check valve 60, the ball 61 is pushed inwardly by the coil spring 62 so as to keep the hydraulic path open when the cylinder block 24 is not in rotation. However, when the cylinder block 24 is in rotational motion, the ball 61 is pushed outwardly by the centrifugal force which tends to oppose the force exerted by the coil spring 62, so that the centrifugal force will overcome the action of the coil spring to force the ball to shut the second path 68b and hence the path 68, as shown in FIG. 3.

Operation of the continuously variable transmission T having the above mentioned construction is now described. As the input shaft 1 is rotated by the engine E, so is the pump cylinder block 24, and the cylinder block 24 rotates the shoe 51 in synchronism therewith through the synchronous gears 54 and 55. Caused by this rotation of the shoe 51, the plunger 38 is given a exhausting stroke when located at descending side of the swash plate 26, for pressurizing the pump hydraulic pressure chamber 39. The plunger 38 located at ascending side is given a intake stroke for depressurizing the hydraulic pressure chamber 39. In this intake stroke, the pump port 40 is made to communicate with the inlet groove 41 to permit the fluid to flow into the hydraulic pressure chamber 39 from the outlet port of the hydraulic motor M which is connected with the inlet port 43, through the second hydraulic path Lb. On the other hand, in the exhausting stroke, the pump port 40 is made to communicate with the outlet groove 42 so that the pressurized fluid is supplied from the outlet port 44 to the inlet port of the hydraulic motor M through the first hydraulic path La. In the hydraulic motor M the output shaft 2 is driven to rotate by means of hydraulic pressure sent through the first hydraulic path La, the rotational motion of the shaft 2 being transmitted to the wheels W.

When, however, the acceleration pedal (not shown) is not depressed and the engine E is in an idling condition, the clutch valve 5 is adapted to be opened so that, although the input shaft 1 is in rotational motion, the fluid expelled from the pump P flows through a short circuit path Lg without driving the hydraulic motor M.

As the acceleration pedal is depressed, the speed of the engine E increases, and the clutch valve 5 is eventually closed to drive the output shaft 2 and the wheels W as described above. It is noted that the above mentioned hydraulic motor M may be, for example, a swash plate type axial plunger motor whose displacment plate can be controlled by varying its swash angle to change the speed reduction ratio. A method to control the speed reduction ratio is, for example, to set a reference engine speed in correspondence with the engine throttle opening and to control speed reduction ratio so as to make the engine speed coincide with the reference speed.

Next, a mode of deceleration to stop the vehicle under control of the variable speed transmission T (which is transmitting the output power of the engine to the wheels) is described.

As the acceleration pedal is released to decelerate the vehicle, the throttle opening becomes zero. Therefore the hydraulic motor M is driven by the power from the wheels W, and the driving force is being transmitted further to the engine through the hydraulic pump P, causing the vehicle to decelerate due to engine braking action. The engine will stall if the deceleration is continued until the vehicle stops, because in that case when the vehicle stops the engine speed becomes zero. In order to avoid this, the clutch valve 5 is adapted to open when the vehicle speed is reduced below a predetermined value.

The opening of the clutch valve 5 accompanying deceleration also takes place in braking to stop the vehicle. However, in a case where a braking is so aggressive that the wheels are quickly locked, the engine speed is quickly lowered with the locking of the wheels before the vehicle speed is lowered to the predetermined speed and the clutch valve 5 is opened. Then, in the event that the engine speed suddenly becomes lower than, say, the idling speed, the centrifugal force acting upon the ball 61 in the centrifugal check valve 60 becomes sufficiently weak to open the valve 60, thus making null the driving load on the hydraulic pump P by the engine and preventing the engine stall even if the opening of the clutch valve 5 is delayed.

The reference engine speed at which the centrifugal check valve 60 is opened is set at a speed lower than the engine idling speed, so that this centrifugal check valve 60 is not opened in normal driving conditions and hence it is not opened in the cases where the continuously variable speed transmission T is under the normal control. It should be understood that in order for the centrifugal check valve 60 to be opened, the biasing force of the coil spring 62 must be greater than the resultant force acting on the ball 11 which is the sum of the centrifugal force caused by the rotation of the cylinder block 24 and the hydraulic force caused by the hydraulic pressure in the hydraulic chamber 39. The biasing force of the coil spring 62 is therefore chosen to satisfy this condition. Incidentally, the hydraulic pressure in the hydraulic pressure chamber 39 becomes exceedingly low when the engine speed becomes smaller than the engine idling speed.

As described above, aggressive braking may result in the locking of the wheels of a vehicle equipped with the continuously variable speed transmission having the above mentioned features. Consequently, the engine speed is lowered rapidly, which in turn causes the speed of the above mentioned member rotating in synchronism with the engine output shaft to be lowered rapidly, too. However, in response to the decrease in the centrifugal force due to the lowering of the speed, the check valve provided in this member is accordingly opened to allow the working fluid to be expelled from the hydraulic pressure chamber of the pump through the check valve, thereby relieving the engine load to the pump and preventing engine stalling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic continuously variable speed transmission, comprising, a plunger-type hydraulic pump driven by an engine and a hydraulic motor driven by hydraulic pressure sent from said pump, at least one of said hydraulic pump and said hydraulic motor being of a variable displacement type, said hydraulic pump comprising a pump cylinder, a plurality of cylinder bores formed in said pump cylinder, and a plurality of plungers slidably engaged in said cylinder bores, a plurality of hydraulic path means for connecting said cylinder bores with a drain, each of said cylinder bores having a separate one of said hydraulic path means communicating with it for connecting said cylinder bore with said drain, and a check valve provided in each of said hydraulic path means for closing said hydraulic path means under a centrifugal force created by said rotation of said pump cylinder when said pump cylinder is in rotation faster than a predetermined speed, and for opening said hydraulic path means against said centrifugal force when said pump cylinder is in rotation slower than said predetermined speed.

2. A hydraulic continuously variable speed transmission as defined in claim 1, wherein said check valve comprises a ball which is so forced as to abut on an opening of said path and to close said hydraulic path by said centrifugal force, and a spring means for biasing said ball away from said opening, and wherein said spring means has a restoring force sufficient to overcome the centrifugal force acting on said ball to keep said ball away from said opening when said member is in rotation slower than said predetermined speed.

3. A valve apparatus in a continuously variable speed transmission, said transmission having a hydraulic pump and a hydraulic motor interconnected by a closed hydraulic circuit, said hydraulic pump being driven by a shaft operatively connected to an engine, comprising,
 a rotatable pump cylinder operatively connected to said shaft,
 a plurality of cylinder bores formed in said pump cylinder,
 a plurality of pump plungers slidably engaged in said cylinder bores,
 hydraulic pressure chambers formed in said pump cylinder bores in said pump cylinder, each cylinder bore having a separate hydraulic pressure chamber,
 a drain,
 a plurality of hydraulic paths communicating said pressure chambers with said drain, each pressure chamber having a separate one of said hydraulic paths communicating the chamber with said drain, and
 a plurality of valve means for selectively closing said hydraulic paths to block a flow of oil from said pressure chambers to said drain when said pump cylinder rotates faster than a predetermined speed, and for selectively opening said hydraulic paths to permit said oil to flow from said pressure chambers to said drain when said pump cylinder rotates slower than said predetermined speed, each of said hydraulic paths having a separate one of said valve means for selectively closing and opening that hydraulic path.

4. A valve apparatus according to claim 3, wherein said valve means acts to oppose a centrifugal force to permit said oil to flow when said pump cylinder rotates slower than said predetermined speed.

5. A valve apparatus according to claim 3, said valve means comprising,
 a ball valve in said hydraulic path, said ball valve being operable between a first position in which said hydraulic path is open and a second position in which said hydraulic path is closed, said ball valve being positioned in said hydraulic path in such a manner that when said pump cylinder rotates, a centrifugal force operates on said ball valve to move said ball valve into said second position, and
 biasing means for biasing said ball valve toward said first position.

6. A valve apparatus according to claim 5, wherein said biasing means opposes said centrifugal force to open said hydraulic path when said pump cylinder rotates at a speed that is less than said predetermined speed.

7. A valve apparatus according to claim 3, wherein said valve means comprises,
 a ball,
 an opening in said path to which said ball may abut to close said path, said ball being forced toward said opening by a centrifugal force by said rotation of said pump cylinder, and
 biasing means for biasing said ball away from said opening, said biasing means having a restoring force sufficient to overcome said centrifugal force and keep said ball away from said opening when said pump cylinder rotates at a speed below a predetermined speed.

8. A valve apparatus according to claim 7, wherein said biasing means comprises a spring.

9. A pressure relief apparatus in a hydraulic continuously variable transmission, said transmission having a hydraulic pump and a hydraulic motor driven by said hydraulic pump, comprising,
 a rotatable pump cylinder of said hydraulic pump,
 a plurality of cylinder bores formed in said pump cylinder,
 a plurality of pump plungers slidably engaged in said cylinder bores,
 a plurality of pressure chambers in said pump cylinder, a separate one of said pressure chambers being formed in each of said cylinder bores,
 a drain, and
 a plurality of relief valve means responsive to a speed of rotation of said pump cylinder for connecting said pressure chambers to said drain when said speed of rotation of said cylinder is below a predetermined speed, each of said pressure chambers having a separate one of said relief valve means associated with it for connecting that pressure chamber to said drain when said speed of rotation is below said predetermined speed.

10. A pressure relief apparatus according to claim 9, said relief valve comprising
 a hydraulic path for connecting said pressure chamber to said drain,
 a ball,
 an opening in said path to which said ball may abut to close said path, said ball being forced toward said opening by a centrifugal force by said rotation of said pump cylinder, and
 biasing means for biasing said ball away from said opening, said biasing means having a restoring force sufficient to overcome said centrifugal force and keep said ball away from said opening when said pump cylinder rotates at a speed below said predetermined speed.

* * * * *